United States Patent [19]
Antal, Jr.

[11] Patent Number: 5,551,958
[45] Date of Patent: Sep. 3, 1996

[54] PROCESS FOR CHARCOAL PRODUCTION FROM WOODY AND HERBACEOUS PLANT MATERIAL

[75] Inventor: Michael J. Antal, Jr., Honolulu, Hi.

[73] Assignee: University of Hawaii, Honolulu, Hi.

[21] Appl. No.: 399,001

[22] Filed: Feb. 24, 1995

Related U.S. Application Data

[60] Division of Ser. No. 148,278, Nov. 8, 1993, Pat. No. 5,435,983, which is a continuation-in-part of Ser. No. 547,953, Jul. 2, 1990, abandoned.

[51] Int. Cl.$^6$ ........................................... C10J 3/00
[52] U.S. Cl. ................................. 44/629; 48/111
[58] Field of Search ...................... 44/589, 591, 629; 48/111, 209

[56] References Cited

U.S. PATENT DOCUMENTS

| | | | |
|---|---|---|---|
| 1,538,505 | 5/1925 | Atkinson . | |
| 2,537,153 | 1/1951 | Nelson . | |
| 3,383,228 | 5/1968 | Rekate | 106/84 |
| 3,855,069 | 12/1974 | Hess et al. | 201/2.5 |
| 3,929,585 | 12/1975 | Grimmett . | |
| 3,950,143 | 4/1976 | Pyle . | |
| 4,129,420 | 12/1978 | Koppelman . | |
| 4,236,897 | 12/1980 | Johnston . | |
| 4,272,322 | 6/1981 | Kobayashi . | |
| 4,425,256 | 1/1984 | Pilipski . | |
| 4,530,702 | 7/1985 | Fetters . | |
| 4,536,584 | 8/1985 | Eskamani et al. . | |
| 4,553,978 | 11/1985 | Yvan . | |
| 4,583,992 | 4/1986 | Rogers . | |
| 4,589,887 | 5/1986 | Aunsholt . | |
| 5,435,983 | 7/1995 | Antal, Jr. | 423/445 |

FOREIGN PATENT DOCUMENTS

| | | |
|---|---|---|
| 2832414 | 1/1980 | Germany . |
| 3616785 | 11/1987 | Germany . |
| 5096486 | 12/1973 | Japan . |
| 218294 | 9/1925 | United Kingdom . |

OTHER PUBLICATIONS

Antal, Jr., et al., "Review of Methods for Improving the Yield of Charcoal form Biomass", *Energy & Fuels*, 4:221–225 (1990) month unavailable.

W. S. L. Mok, et al., "Effects of Pressure on Biomass Pyrolysis. II. Heats of Reaction of Cellulose Pyrolysis", *Thermochimica Acta*, vol. 68, pp. 165–186 (1983) month unavailable.

W. S. L. Mok, et al., "Formation of Charcoal from Biomass in a Sealed Reactor", *Ind. Eng. Chem. Res.*, vol. 31, No. 4, pp. 1162–1166 (1992) month unavailable.

E. G. Baker, et al., "Methanol Synthesis Gas from Wood Gasification", *Energy Progress*, vol. 3, No.4, pp. 226–228 (1983) month unavailable.

M. J. Antal, Jr., et al., "A New Technology for Manufacturing Charcoal from Biomass", *Energy from Biomass & Wastes XV Conference, Washington, D.C.*, pp. 1–10 (1991) month unavailable.

*Primary Examiner*—Jacqueline V. Howard
*Attorney, Agent, or Firm*—Fish & Richardson P.C.

[57] ABSTRACT

An improved batch process for the pyrolytic conversion of woody and herbaceous plant material is provided which yields charcoal, on a dry weight basis, in yields ranging from about 35% to about 50%, having volatile matter content of about 25% or less, and fuel value of 13000 BTU/pound. The batch process can be conducted in two hours or less per batch with virtually instantaneous reloading for subsequent batches without substantial cooling of the reactor utilized for the process and without exposing the hot processed charcoal to air or oxygen sufficient to cause combustion upon removal from the reactor.

4 Claims, 1 Drawing Sheet

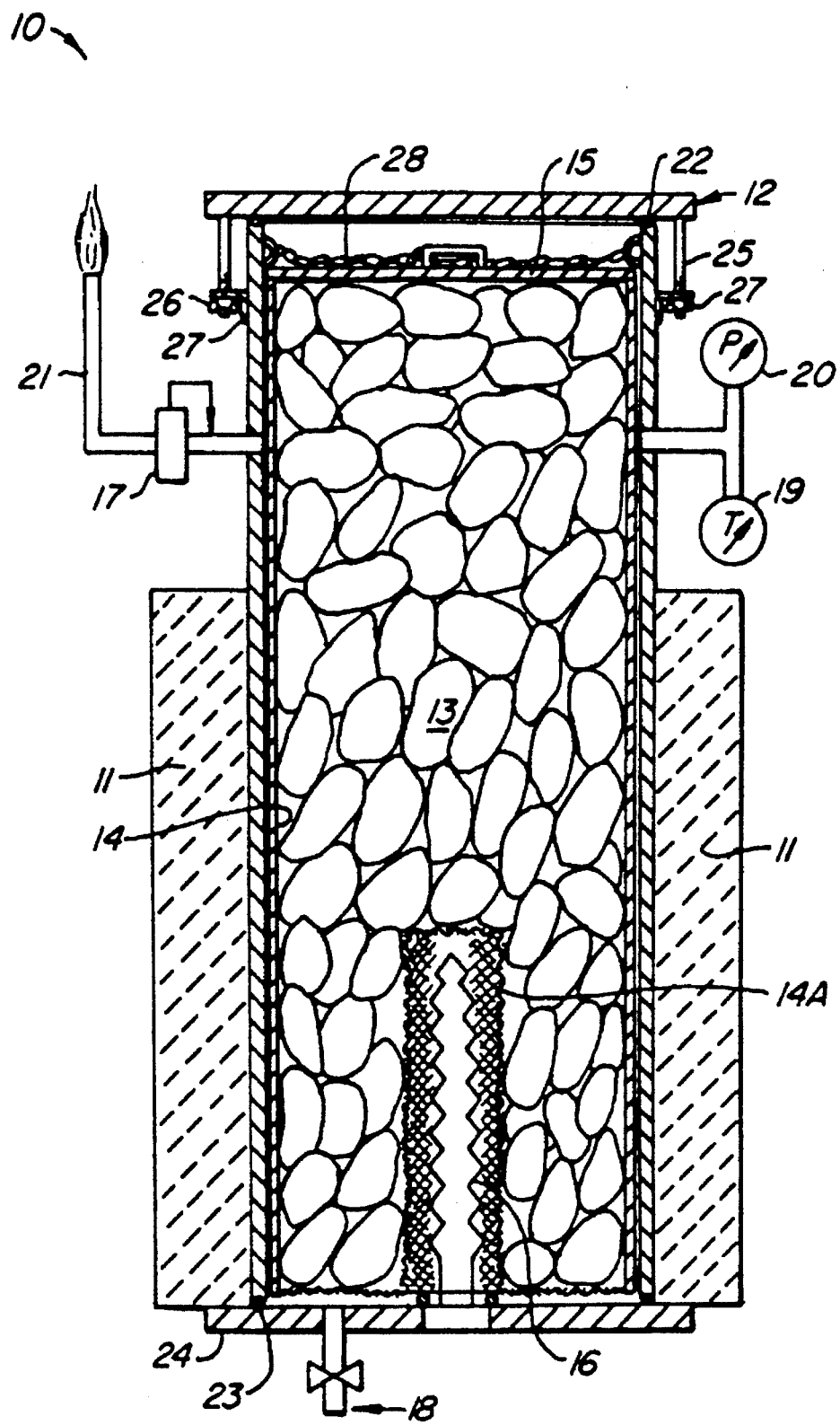
FIGURE

PROCESS FOR CHARCOAL PRODUCTION FROM WOODY AND HERBACEOUS PLANT MATERIAL

This is a division of application Ser. No. 08/148,278 filed Nov. 8, 1993, now U.S. Pat No. 5,435,983, which is a continuation-in-part of Ser. No. 07/547,953, filed Jul. 2, 1990, now abandoned which is incorporated herein by reference in its entirety.

FIELD OF THE INVENTION

The present invention relates to the production of charcoal from woody or herbaceous plant material.

BACKGROUND OF THE INVENTION

The phrase "woody and herbaceous plant material," as used herein, broadly includes biomass, such as wood, logs, slabs, chips, and corn cobs. This term is also intended to include processed cellulosic materials such as pulp, paper board, paper, bagasse, rope, and other biomass of plant origin. According to the present invention the woody and herbaceous materials are converted to charcoal by pyrolytic conversion.

The term "inert" in the context of the present invention means that such compound, composition or material does not react with wood, or its by-products of pyrolysis, at temperatures and pressures attained within the reaction container in practice of the present invention.

A conventional art of charcoal manufacture typically involves an eight day batch cycle of loading, heating the biomass feedstock, cooling, and unloading the charcoal. The yield of a good quality charcoal (on an oven-dry, weight basis) from a conventional process is typically 25%, and rarely exceeds 35%. A good quality charcoal will have a volatile matter content of 35% or less.

Grimmett, U.S. Pat. No. 3,929,585, discloses the heating of wood in a fluidized bed to the temperature range of 138°–538° C. However, charcoal yields of only about 20% (on a dry weight basis) are obtained. Baker, et al., *Energy Progress*, Vol. 3 (No. 4) pages 226–228, Dec. 19, 1983, also disclose experiments wherein wood is heated in a-fluidized bed. Carbon conversion yields resulting from heating the wood in the fluidized bed in absence of a catalyst are reported in the range of 9% (on a carbon basis at one atmosphere) to 21–27% (on a carbon basis at ten atmospheres). However because charcoal is almost pure carbon whereas the wood feedstock is only about 50% carbon, the wood to char yields obtained by Baker, et al. are only about 50% of the stated values, when expressed on a dry weight basis. Thus, Baker, et al. obtained wood char yields ranging from about 4.5% to 10.5–13.5% on a dry weight basis. These values are in accord with the low yield reported by Grimmett in a fluidized bed.

Mok and Antal, *Thermochmica Acta*, 68 (1983) 165–186, disclose pyrolysis of wood products at various temperatures and pressures. The highest char yield reported in the paper is about 22%. Mok et al. use an experimental device whereby gas is flowed over the biomass during the pyrolysis reaction, which resembles a fluidized bed condition. The Mok et al. paper shows that variation of pressure alone does not significantly influence the charcoal yield.

In Atkinson, U.S. Pat. No. 1,538,505, a distillation process is disclosed whereby the carbonaceous material (corn cobs, woodchips, etc.) is first extracted with water and steam. The remaining solid residue is then carbonized in a retort. The reactive gases from pyrolysis are diluted and carried away from the solid substrate in the retort, and there is a low yield of charcoal.

Accordingly, it is an object of the present invention to provide an economical process for efficiently converting woody and herbaceous plant material to solid charcoal having a heat value of about 13000 BTU/lb. on a moisture and ash free basis.

According to the present invention, typical batch turn around time is less than two hours, and the yield of charcoal typically ranges from about 35% to 50% The charcoal made in accordance with the present invention typically has a volatile matter content of less than about 25%, and a heat value of about 13000 BTU/lb.

It is a further object of the present invention to provide an improved process for converting woody and herbaceous plant material.

These and other objects and advantages to the present invention will be readily apparent upon reference to the drawing and the following description.

SUMMARY OF THE INVENTION

The present invention provides a batch process for the pyrolytic conversion of woody and herbaceous plant material to charcoal, comprising the steps of providing such material in an enclosed container; heating the material to a temperature above about 350° C. for a period of time sufficient to raise the pressure within said container to at least about 15 psig but less than about 150 psig; and maintaining the pressure within the container below about 150 psig for a period of time sufficient to convert the woody or herbaceous plant material to charcoal with a yield in excess of 35% (on a dry weight basis). The woody and herbaceous material may be used without pretreatment, other than cutting the wood to handleable sizes and shapes, therefore the material may have a high or low moisture content characteristic to the type of wood or herbaceous material. Some woods have higher moisture contents than others. Also, some woods may be cut and stored in a wet or dry environment, so their actual moisture content may be higher or lower than their natural moisture content. It is therefore contemplated that the moisture content of the woody and herbaceous material may be up to about 50%, and as low as about 1%. In any case, no special oven-drying of the wood is necessary, which is thus an advantageous feature of the invention.

The preferred apparatus for conducting the process of the invention is also provided which comprises a vertical, cylindrical reactor, a sealable door at the top thereof, a centrally located, vertical heating means within the reactor, and a pressure regulating means for regulating the pressure within the reactor.

To use the reactor, a canister having a cavity to accommodate the heater is filled with woody and herbaceous plant material and placed in the reactor. After heating, the canister full of hot charcoal is lifted out of the reactor and another canister full of material is inserted.

BRIEF DESCRIPTION OF THE DRAWING

The accompanying FIGURE is a cross section elevational view of a preferred apparatus for conducting the process of the present invention.

DESCRIPTION OF THE PREFERRED EMBODIMENT

The process of the present invention will be described hereafter in conjunction with the apparatus shown in the accompanying FIGURE. It will be realized, however, that other apparatus may be utilized by which the process parameters can be maintained and by which removal of the processed charcoal can be accomplished without exposure to air or oxygen.

With reference to the accompanying FIGURE, the woody and herbaceous plant material utilized according to process may be provided in any convenient form, varying from particles (such as sawdust) to cylindrical logs six inches or more in diameter and several feet long. It is an advantage of the present invention that it may be utilized on plant materials having high moisture content, i.e., moisture contents over about 15% by weight and as high as about 50% by weight.

The cylindrical reactor 10 will be placed in an insulated environment comprising insulation material 11. The insulation material may be Kaowool or other, high temperature insulation. Typically, the reactor 10 will be imbedded in insulation material 11. By surrounding the reactor 10 with insulation material 11, it need not be cooled between loads, thereby rendering the process more efficient than if cooling were required in order to reload the reactor.

The upper end of the reactor, including the submarine hatch door 12, as shown, is not surrounded by insulation. Prior to loading the reactor 10, the carbonaceous material 13 is loaded into the canister 14 by opening lid 15. The cylindrical cavity 14A within the canister is preferably made from a metal screen or perforated metal to permit hot gases produced during pyrolysis to flow to and contact the heater 16. After canister 14 is loaded with carbonaceous material 13, it is lowered into reactor 10 via hatch door 12 and sealed. No other material is admitted into the reactor. A vertical, centrally located heater 16 (such as an electrical resistance heater or gas-fired radiant heater) is utilized to heat the canister 14 and carbonaceous material 13. A pressure regulator 17 is utilized to regulate the pressure within the reactor 10 as pressure rises with heating. To relieve excess pressure within the reactor before unloading, a depressurizing blow down valve 18 is provided. Other details of the figure will be discussed below.

The temperature and pressure within the reactor may be monitored, respectively, by a temperature sensor 19 such as a thermocouple, and pressure gauge 20. During the period of heating the pressure will rise due to the volatilization of matter (including residual water) from the woody and herbaceous plant material. The pressure regulator 17 will be set so that the maximum pressure within the reactor 10 will be in the range of about 100–150, typically about 100 psig. By maintaining the temperature within the container above about 350° C. to a maximum of about 550° C., and by maintaining the pressure to about 100 psig, the residence time for conversion of the plant material to charcoal with a yield of about 40% or more (on a dry weight basis) will be about two hours or less, usually about one hour, particularly if the container has been preheated. The temperature within the reactor should not exceed about 550° C.

The exact residence time of the plant material within the container under these conditions will depend upon the particular type of material used and its moisture content, but typically the residence time will be less than two hours.

The optimum conditions for a particular plant material can be readily determined by those of ordinary skill in the art by running test samples of the particular plant material.

During the residence time of the plant material within the reactor 10, pyrolysis will take place and the excess vapor and gas will be removed through line 21 past the pressure regulator 17. These gases may be recovered and burned in an external combustor (not shown) as a further source of heat for the process according to the present invention. Alternatively, the gases may be burned as shown prior to emission into the atmosphere.

It is a feature of the present invention that, to maximize efficiency, the reactor, between loads, need not be cooled to a handleable temperature. Therefore, when the appropriate residence time has been achieved under a given set of conditions within the container to produce charcoal, heater 16 may be lowered, turned off, or maintained at the same level, as desired. Excess pressure is removed through valve 18 prior to opening submarine hatch door 12. Canister 14 is tight; consequently minimizing entry of air into canister 14 so the hot charcoal within the canister cannot burn. A small amount of air may enter the canister via cavity 14A, but if the canister is placed on an even or soft surface, the outer edges of the bottom of the canister can effectively serve as seals. After cooling, charcoal is unloaded from the canister 14. Immediately after removing a canister full of hot charcoal from the reactor 10, another canister full of woody or herbaceous material may be lowered into the reactor. Thereafter the reactor may be sealed and heated again, without allowing any substantial cooling of the reactor 10, thereby making the overall process more efficient.

Referring to the figure, other features of the reactor 10 include upper sealing ring 22, lower sealing ring 23, and a lower plate 24. Submarine hatch 12 is secured by a plurality of tightening bolts 25 secured by nuts 26 against brackets 27. The canister 14 accommodates a chain handle 28, for raising and lowering into reactor 10.

The following examples are provided for the purpose of illustration and are not intended to limit the invention in any way.

EXAMPLE 1

Loads of two different types of wood available in Hawaii were converted to charcoal in a reactor of the type described in the figure. Kiawe is a dense, dry wood whereas eucalyptus is light and moist. As shown in Table 1 the yields of charcoal produced from these two woods by the method of the present invention are virtually identical.

TABLE 1

| REACTOR PERFORMANCE | | |
|---|---|---|
| | Run #1: EUCALYPTUS | Run #2: KIAWE |
| Wood Loaded (Moist) | 20 kg. | 41 kg. |
| Moisture Content (Wet Basis) | 7.0 kg. (35%) | 5.7 kg. (14%) |
| Charcoal Yield | 5.7 kg. (44%)+ | 16 kg. (45%)+ |
| Heating Time | 2.5 hrs (Cold start) | 2.5 hrs. (Cold start) |
| Total Heat Required | 19 kw-hr. 3.3 kw-hr./kg* | 19 kw-hr. 1.2 kw-hr/kg* |

+Fractional yield of charcoal is the ratio of weight of charcoal produced to the wood fed on an oven dry basis.
*kw-hr/kg. of charcoal production.

EXAMPLE 2

In Table 2 there is shown an analysis of "Aloha" eucalyptus charcoal and "Aloha" kiawe charcoal made according to the invention as compared to three types of commercial charcoals. The two charcoals made by the present invention are comparable to the commercial charcoals.

TABLE 2

COMPARISON OF ALOHA CHARCOAL WITH COMMERCIAL CHARCOAL

|  | ALOHA EUCALYPTUS CHARCOAL | ALOHA KIAWE CHARCOAL | COMMERCIAL BRIQUETTE CHARCOAL | COMMERCIAL KIAWE CHARCOAL | COMMERCIAL MESQUITE CHARCOAL |
| --- | --- | --- | --- | --- | --- |
| Btu/lb | 13800 | 13200 | 9610 | 12800 | 13700 |
| Volatile Matter | 23.3% | 21.4% | 36.4% | 28.3% | 9.04% |
| Fixed Carbon | 75.4% | 75.9% | 46.5% | 69.8% | 86.8% |
| Ash | 1.29% | 2.65% | 17.2% | 1.9% | 4.17% |

EXAMPLE 3

Two runs in the reactor were conducted with air-dried Leucaena wood with the following results.

TABLE 3

TWO RUNS ON AIR-DRIED *LEUCAENA*

|  | RUN A | RUN B |
| --- | --- | --- |
| Load (kg) | 21.8 | 21.8 |
| Moisture content (%) | 40.9 | 39.9 |
| Heating period (min.) | 112 | 111 |
| Power input (kW-hr) | 19 | 19 |
| Power consumption (kW-hr/kg dry wood) | 1.48 | 1.42 |
| Charcoal yield (% dry basis) | 40.5 | 40.9 |

Five runs in the reactor were conducted with oven-dried (110° C.) Leucaena wood with the following results:

TABLE 4

FIVE RUNS ON OVEN-DRIED *LEUCAENA*

|  | RUN | | | | |
| --- | --- | --- | --- | --- | --- |
|  | 1 | 2 | 3 | 4 | 5 |
| Load (kg) | 13.83 | 13.61 | 13.30 | 14.52 | 17.34 |
| Moisture content (%) | 0 | 0 | 0 | 1.5 | 3.3 |
| Heating period (min.) | 41 | 28 | 23 | 15 | 22 |
| Power input (kW-hr) | 6.0 | 5.0 | 3.5 | 2.6 | 3.5 |
| Power consumption (kW-hr/kg feed) | 0.43 | 0.37 | 0.26 | 0.18 | 0.20 |
| Charcoal yield (% dry basis) | 37.7 | 38.3 | 39.3 | 42.2 | 41.9 |

The invention may be embodied in other specific forms without departing from the spirit or essential characteristics thereof. The present embodiments are therefore to be considered in all respects as illustrative and not restrictive of the scope of the invention. The invention is indicated by the appended claims and all modifications which come within the meaning and range and equivalency of the claims are therefore intended to be embraced therein.

What is claimed is:

1. A reactor for pyrolytic conversion of woody and herbaceous plant material to charcoal and gas, comprising, a housing having a sealable opening for receiving a canister containing said material;

heating means for heating said reactor;

pressure regulating means for regulating removal of gas from said reactor to control pressure within said reactor;

insulation means surrounding at least a portion of the sides of said reactor; and a removable canister, said canister being receivable in said housing to form a tight seal to minimize exposure of the contents of said canister to the atmosphere when said sealable opening to said housing is open.

2. A reactor according to claim 1 further comprising valve means for releasing pressured gas from said reactor prior to opening said sealable opening to remove said canister.

3. A reactor according to claim 1 wherein said heating means comprises a resistance heater.

4. A reactor according to claim 1 wherein said heating means comprises a gas-fired radiant heater.

* * * * *